Aug. 7, 1962   H. GARRIGAN   3,048,363
BUTTERFLY VALVE
Filed Feb. 21, 1957   2 Sheets-Sheet 1

INVENTOR.
HELEN GARRIGAN.
BY
William J. Ruano
HER ATTORNEY.

Aug. 7, 1962  H. GARRIGAN  3,048,363
BUTTERFLY VALVE
Filed Feb. 21, 1957  2 Sheets-Sheet 2
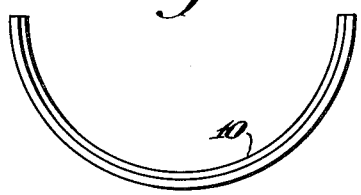
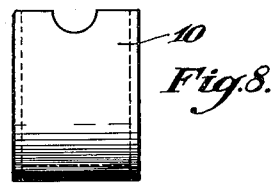
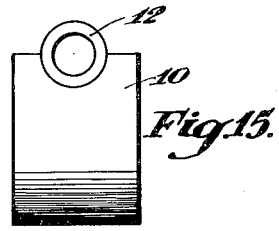
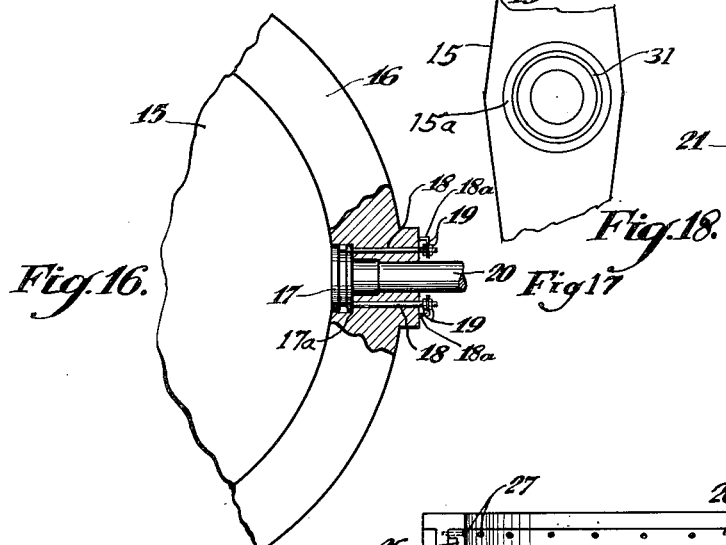
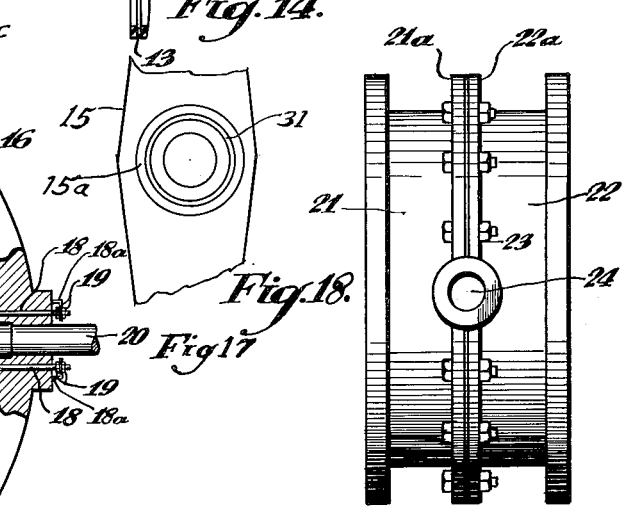
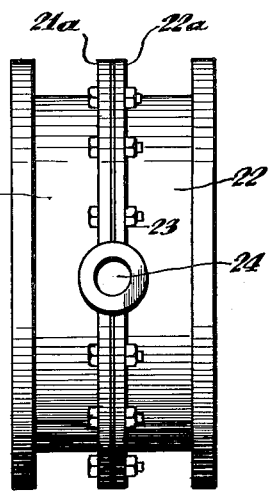
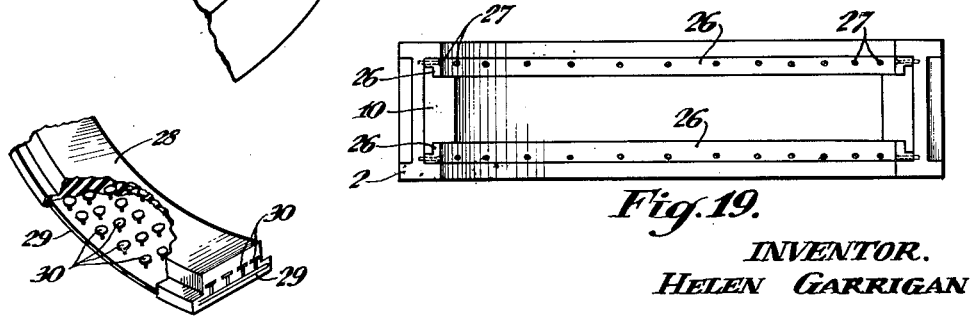
INVENTOR.
HELEN GARRIGAN
BY William J. Ruano
HER ATTORNEY.

United States Patent Office 3,048,363
Patented Aug. 7, 1962

3,048,363
BUTTERFLY VALVE
Helen Garrigan, 1086 Greenlawn Drive, Pittsburgh, Pa.
Filed Feb. 21, 1957, Ser. No. 641,519
2 Claims. (Cl. 251—307)

This invention relates to a valve, and more particularly to a butterfly valve which is especially useful for water lines of large size as in municipal water systems.

Attempts have been made to make butterfly valves water-tight by using rubber or other resilient seats which are generally cemented to the valve body.

An outstanding disadvantage of such resilient seats is that they often become loosened by the velocity and pressure of the water when closing the valve. To improve this condition various fibers have been embedded in the resilient seats, but this has not solved the problem.

Another outstanding disadvantage of conventional types of large butterfly valves used in municipal water systems is that the resilient seat or other interior parts of the valve can be replaced only by removing the whole valve from the pipe line, resulting in interruption of water service for long periods of time. A further disadvantage is that even adustments of the interior parts of the valve necessitate taking the valve apart.

A still further disadvantage of conventional butterfly valves is that they do not remain water-tight for long periods of time, and are of such construction that water seeps into the hollow of the disc and other parts and, upon freezing, will cause damage or leakage of the valve.

An object of the present invention is to provide a novel butterfly valve which is devoid of the above named disadvantages and which is particularly useful in municipal water systems.

A more specific object of the present invention is to provide a novel butterfly valve which is built in sections or halves in a manner so that the resilient seat or other parts may be changed without removing the whole valve from the pipe line.

Another object of the invention is to provide a novel metal-reinforced resilient seat and slidable connection between the seat and valve body which will securely hold the seat in place to insure that the seat will not become dislodged by the velocity and pressure of the water, therefore which will maintain a water-tight seal for an amazingly long period of time.

A still further object of the invention is to provide a novel seal at the valve disc bearing which is exteriorly adjustable so as to compensate for seat wear and maintain a water-tight seal throughout the entire life of the valve and without the necessity of taking the valve apart.

Other objects and advantages of the invention will become more apparent from a study of the following specification taken along with the accompanying drawings, wherein;

FIGURE 7 is an elevational view and FIGURE 8 is an end view of a modified form of seat half.

FIGURES 9 and 10 are sections showing, separately, the seat 10 and metal reinforcement 11, respectively, before vulcanization together.

FIGURE 11 is a cross-sectional view of the seat supporting portion of the valve body, showing the seat parts 10 and 11 vulcanized together as one unit.

FIGURES 12, 13 and 14 are front, side and cross-sectional views of bearing metal-reinforced washers supported in the ends of the resilient seat assembly.

FIGURE 15 shows the bearing of FIGS. 12–14 mounted in one end of the seat of FIGURE 7.

FIGURE 16 is a fragmentary view, partly in cross-section, of the valve disc bearing showing external means for adjusting the bearing seal.

FIGURE 17 shows an O-ring type seal in the disc hub.

FIGURE 18 is an end view of a modified valve, being split vertically instead of horizontally.

FIGURE 19 is a top or plan view of a modification of the means for securing the valve seat in place and FIGURE 20 is a fragmentary perspective view, with parts cut away, illustrating a modified form of metal reinforcement embedded in the resilient seal.

Figure 1:
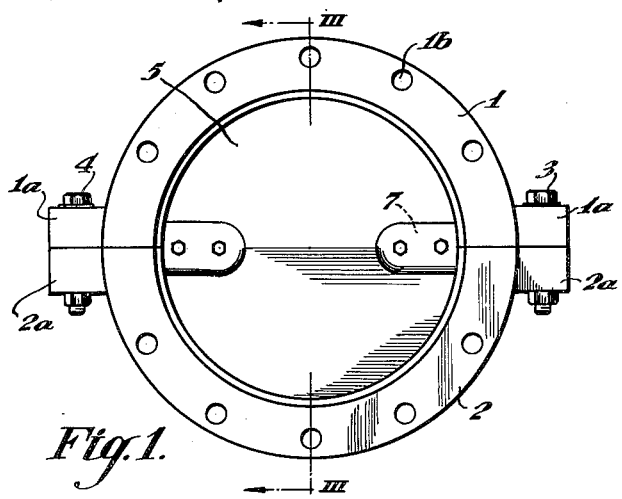
FIGURE 1 is a front elevational view of a butterfly type of valve embodying the principles of the present invention.
Figure 2:
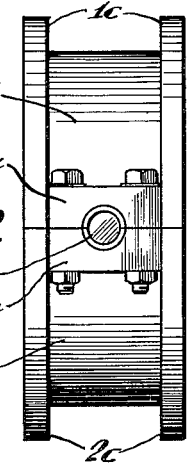
FIGURE 2 is a side or end view of the valve shown in FIG. 1.
Figure 3:
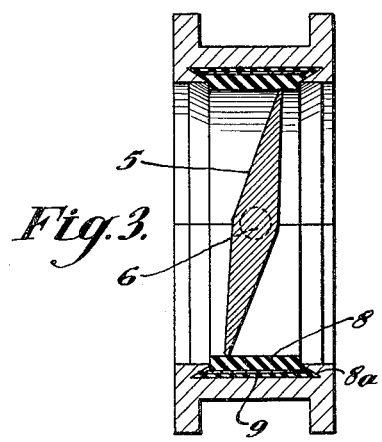
FIGURE 3 is a vertical cross-sectional view taken along line III—III of FIG. 1.

Referring more particularly to FIGURES 1, 2 and 3 of the drawing, numeral 1 denotes the top half and numeral 2 denotes the bottom half of a valve body or housing which is split horizontally into complementary parts. Flanges 1c and 2c are provided in the upper and lower halves, respectively, which flanges are provided with holes 1b for bolting to adjoining parts. Bearing flanges 1a and 2a are integral with and extend horizontally from the top and bottom halves and are bolted together by bolts 3 and 4. A valve louvre or disc 5 is pivotally mounted in the valve body by means of shafts 6 which extend through flanges 1a and 2a and into the bosses 7.

Figure 4:
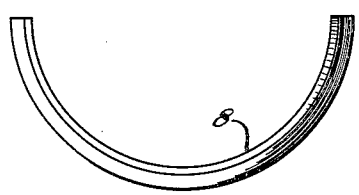
FIGURE 4 is an elevational view of one of the resilient seat halves shown in FIGS. 1–3.

An important feature of the invention resides in the construction of the parts forming the valve seat. Semi-circular resilient seats 8, as shown in FIGS. 3 and 4, made of rubber, neoprene or other resilient material, are made of dove-tail shape and fitted into dove-tail grooves 8a in the valve body as shown more clearly in FIG. 3. Each resilient seat 8 is provided with a metal reinforcing strip 9 of steel, brass or other metal, which is preferably embedded in the rubber. Since the resilient seats are inserted in the body halves 1 and 2 by sliding them longitudinally into the dove-tail grooves 8a, metal strips 8 may be made of substantial thickness and may be sufficiently wide so as to extend beneath the overhanging portions of dove-tail groove 8a of the body to insure maximum rigidity and to prevent any possibility of dislodgment as a consequence of the velocity and pressure of the water when closing the valve.

Figure 5:
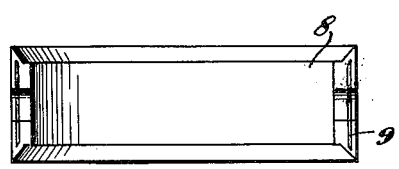
FIGURE 5 is a top view and FIGURE 6 is an end view of the metal-reinforced resilient seat shown in FIG. 4.
Figure 6:
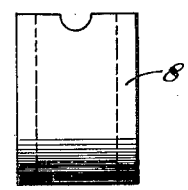

As shown in FIG. 3, valve disc 5 is normally set at approximately 80° with respect to a horizontal plane dividing the valve body halves 1 and 2. Thus when the resilient seat wears the valve disc can be moved to 82°, 83° etc. up to 90°. As the seat gradually wears and tends to permit leakage the valve disc may be closed further. Moreover provision is made for seat wear at the valve shafts 6 which shafts fit into the semi-circular end portions of seats 8 as shown more clearly in FIGS. 5 and 6 (see FIGS. 12 to 16).

An important feature of the two-part valve body is that it permits interior parts such as the resilient seat to be changed without removing the whole valve from the pipe line.

The two piece body provides a means of keying the valve disc 5 to the shafts and then assembling by setting the disc and shafts into the complementary halves of the valve body. In conventional valve bodies forming a continuous circle, the shaft must have a keyway extending from the end of the shaft to the middle thereof to permit sliding of the shaft through the bearing and into the valve disc where the key is directed into the keyway and the shaft must be pressed on through the disc until it protrudes through the valve body or into the bearing. All this cannot be done and still maintain a tight fit between the key and keyways.

FIGS. 7 to 11 inclusive show a modified form of resilient seat half 10 having stepped side portions and which is reinforced by a metal backing strip 11 having sides which are bent up to partially enclose the resilient seat and adding greater strength and vulcanizing surface. Parts 10 and 11 are vulcanized together and then slid underneath an overhanging portion of the groove formed in the valve body, as shown in FIG. 11.

FIGS. 12, 13 and 14 show a resilient bearing 12 of rubber or similar material in the form of a ring having a peripheral groove 13 into which is fitted the semi-circular end portion of resilient seat 10 as shown more clearly in FIGS. 8 and 15. Thus a resilient seat or bearing is provided for the butterfly valve disc 5.

FIG. 16 shows another important feature of the invention which enables adjustment from outside the valve to compensate for wear of the resilient seat for disc 15. A resilient seat 17, in the form of a flat disc of rubber, neoprene or similar material, provides a plane surface against which the valve disc 15 revolves as the butterfly valve is opened or closed. A flanged, slidably mounted bearing 17a is connected to pushrods 18 sliding through holes in brackets 18a and which are held in any selected horizontal position by bolts 19. This arrangement provides a means for selectively increasing the pressure exerted against the resilient seat 17 by pressing the bearing flange 17a against it. Of course other arrangements may be employed to adjust or regulate the pressure of the bearing flange against the hub of the valve disc 15 to compensate for wear. This feature of adjusting for wear from outside the valve is unique and very important since it eliminates the necessity of removing the valve from service.

FIG. 17 shows a continuous resilient ring 31 set into a circular groove or recess on the hub 15a of the valve louvre or disc 15, which resilient endless ring may be referred to as an O ring. Such ring serves several purposes, such as (1) assuring a leak-proof contact point between the valve louvre hub 15a and resilient valve seat (2) providing a contact point of low friction coefficient between the hub 15a and resilient valve seat thereby reducing seat wear and (3) providing a seal to prevent the liquids contained and controlled by the valve from leaking into the hollow valve louvre, which feature is very important in many installations, such as when the valve is used to contain and control water in areas that experience temperatures below 32° F. Water can and does enter the valve louvre through the very small space between it and the shaft and remains there and may freeze and burst the louvre when the pipe line that contains the valve is drained during cold weather.

FIG. 18 shows a modified form of valve body which is split vertically instead of horizontally into two halves 21 and 22 having flanges 21a and 22a bolted together by bolts 23 and having a shaft opening or bearing 24. The interior parts may be the same as described hereinbefore.

FIG. 19 shows a modification of the means for securing the resilient seat 10 in place. Instead of forming a dovetail in the body, separate metallic retainer rings 26 are provided of angle shape and which are provided with spaced holes through which bolts or screws may be inserted to hold seat 10 securely to the valve body half. Thus it is not necessary to slide the seat 10 into the body half but merely to lay it in place and lower rings 26 thereon.

One or more sealing ribs or rings (not shown) may be formed on the underside of rings 26 to provide a better seal. The modification shown in FIG. 19 is especially suitable for the split valve shown in FIGS. 1–3.

FIG. 20 shows a still further modification of a metal strip-reinforced resilient seat 28. The metal reinforcing strip 29 may be provided with a plurality of upstanding rivet-like elements 30 which will provide a stronger and more secure bond with the rubber of seat 28 vulcanized thereto.

It should be noted that one or more of the features shown may be used in either the horizontally split body illustrated in FIGS. 1 to 3 or the vertically split body shown in FIG. 18, for instance, the sealing feature, or the various modifications of the resilient seats (FIGS. 3, 9–11, 20) etc.

For the valve body shown in FIG. 18, a continuous ring type of resilient seat can be used of the construction shown in any of the modifications shown, but particularly that of FIGS. 9–11.

A preferred valve is one having the split body shown in FIGS. 1–3, a groove as shown in FIG. 11, an external seal adjusting means as shown in FIG. 16, a seal clamping means as shown in FIG. 19 and with an O-ring seal as shown in FIG. 17.

Furthermore my split valve body or externally adjustable bearing (FIG. 16) may be used with other types of seals or seats, such as seats of bronze, babbit or other suitable metal, since they also tend to leak at the shaft and hub. The O-ring of FIG. 18 is also suitable for metal seated valves.

Thus it will be seen that I have provided an efficient butterfly valve which is especially suitable for large water pipe lines and in which parts, such as the resilient seat, louvre, etc. may be replaced without removing the valve from the line; furthermore I have provided a metal-reinforced resilient seat that prevents dislodgement and insures security of the resilient seat; also, I have provided a resilient seated valve that can be adjusted from outside the valve to compensate for wear, without interfering with valve service; additionally, I have provided a resilient seated valve in which contact between the valve disc is in the open, closed or intermediate positions and in which means are provided to prevent leakage of liquid into the hollow valve disc; also, I have provided a resilient seated valve in which the fluid being container or controlled cannot enter the valve bearings regardless of the position of the valve disc.

While I have illustrated and described several embodiments of my invention, it will be understood that these are by way of illustration only, and that various changes and modifications may be made within the contemplation of my invention and within the scope of the following claims.

I claim:

1. A butterfly valve comprising a cylindrical housing divided centrally in a plane which contains the flow axis and into two complementary parts detachably fastened together, a closure disc pivotally mounted in said housing, two semi-circular resilient seats arranged in a circular path on the inner peripheral wall of the housing, said inner wall having an undercut groove into which said seats are fitted, said seats being provided with metal reinforcing strips of substantial thickness and of such width that the sides of the strips extend underneath the overhanging portions of said groove and sufficiently rigid so as to require said seats to be relatively longitudinally slid into said grooves, whereby resistance to dislodgement from the grooves by fluid pressure is increased.

2. A butterfly valve comprising a cylindrical housing formed of two semi-circular halves detachably fastened together in a plane which contains the flow axis and having integral bearings extending radially from the ends thereof, a valve disc having diametrically opposite shafts projecting therefrom and journalled in said bearings, an annular groove undercut in the inner wall of said housing, and an annular resilient seat for said disc detachably fitted in said groove, said groove and seat formed of two semi-circular portions, and semi-circular sheets of substantial thickness bonded to and reinforcing said seat portions and having sides extending underneath the sides of the grooves, said sheets being sufficiently rigid so as to require said seats to be relatively longitudinally slid into said grooves, whereby resistance to dislodgement from the grooves by fluid pressure is increased.

References Cited in the file of this patent

UNITED STATES PATENTS

| | | |
|---|---|---|
| 1,844,641 | De Wein | Feb. 9, 1932 |
| 1,858,587 | Grant | May 17, 1932 |
| 1,951,283 | Kinzie | Mar. 13, 1934 |
| 1,977,351 | Phillips | Oct. 16, 1934 |
| 2,054,369 | Francis | Sept. 15, 1936 |
| 2,083,154 | Kinzie | June 8, 1937 |
| 2,321,257 | Spicer | June 8, 1943 |
| 2,789,785 | Woods | Apr. 23, 1957 |

FOREIGN PATENTS

| | | |
|---|---|---|
| 670,327 | Germany | of 1939 |
| 994,490 | France | of 1951 |